United States Patent [19]

Takeuchi et al.

[11] Patent Number: 5,023,304
[45] Date of Patent: Jun. 11, 1991

[54] PROCESS FOR PRODUCING STYRENE-BASED POLYMER

[75] Inventors: Mizutomo Takeuchi; Masahiko Kuramoto, both of Ichihara, Japan

[73] Assignee: Idemitsu Kosan Co., Ltd., Tokyo, Japan

[21] Appl. No.: 489,710

[22] Filed: Mar. 7, 1990

[30] Foreign Application Priority Data

Mar. 28, 1989 [JP] Japan ................................. 1-73816

[51] Int. Cl.$^5$ .......................................... C08F 12/08
[52] U.S. Cl. .................................... 526/160; 526/159; 526/165; 526/346; 526/347.1
[58] Field of Search ................ 526/88, 159, 165, 160, 526/346, 347.1

[56] References Cited

U.S. PATENT DOCUMENTS 3,112,301  11/1963  Natta et al. .................... 526/159 X

FOREIGN PATENT DOCUMENTS 0272584  6/1988  European Pat. Off. ............ 526/165
0322663  7/1989  European Pat. Off. ............ 526/160

*Primary Examiner*—Fred Teskin
*Attorney, Agent, or Firm*—Frishauf, Holtz, Goodman & Woodward

[57] ABSTRACT

Disclosed is a process for producing a styrene-based polymer by contacting a styrene-type monomer with alkylaluminoxane previously, adding a transition metal compound and then polymerizing of the styrene-type monomer.

By using the process of the present invention, polymerization of a styrene-type monomer can be carried out with a high catalytic activity, and a styrene-based polymer having high syndiotacticity can be obtained with high efficiency.

The sytrene-based polymer having a high degree of syndiotactic configuration of this invention has various excellent physical properties such as heat resistance and chemical resistance, and can be effectively and widely utilized for various applications.

19 Claims, No Drawings

PROCESS FOR PRODUCING STYRENE-BASED POLYMER

BACKGROUND OF THE INVENTION

1. Field of the Invention

This invention relates to a process for producing a styrene-based polymer, and more particularly it relates to a process for producing a styrene-based polymer in which the stereochemical structure of the polymer chain comprises a syndiotactic configuration with good efficiency.

2. Description of Related Arts

A styrene-based polymer produced by the radical polymerization method has an atactic configuration in its stereochemical structure. It is molded into various shapes by various molding methods such as injection molding, extrusion molding, blow molding, vacuum molding and cast molding, and has been widely used for domestic electric appliances, office appliances, household goods, packaging containers, toys, furnitures, synthetic papers and other industrial materials.

However, a styrene-based polymer having atactic configuration has problems that it is inferior in heat resistance and chemical resistance.

The present inventors have previously developed a styrene-based polymer with high syndiotacticity, and it is further shown in Japanese Patent Application Laid-Open No. 187708/1987 that a styrene-based polymer having syndiotactic configuration can be obtained by using a two-component system catalyst comprising (A) a titanium compound and (B) a reaction product (an alkylaluminoxane) of an organic aluminum compound and a condensing agent.

However, the activity of the above catalyst is not sufficiently high and in particular it involves the problem that the cost of the catalyst is high because expensive alkylaluminoxane is used.

SUMMARY OF THE INVENTION

An object of the present invention is to provide a process for producing a styrene-based polymer having syndiotactic configuration with good efficiency by increasing the catalyst activity and relatively decreasing the cost of the catalyst.

As the result of the inventors' study, it has been found that the catalyst activity can be improved by initially contacting a styrene-type monomer with alkylaluminoxane. The present invention has been accomplished as a result of such a finding.

The present invention relates to a process for producing a styrene-based polymer which comprises contacting a styrene-type monomer with alkylaluminoxane, adding a transition metal compound to the resulting mixture and then polymerizing the styrene-type monomer.

DESCRIPTION OF THE PREFERRED EMBODIMENTS

The styrene-type monomer to be used in the present invention is styrene and/or a styrene derivative. Examples of the styrene derivative include alkylstyrenes such as p-methylstyrene, m-methylstyrene, o-methyl-styrene, 2,4-dimethylstyrene, 2,5-dimethylstyrene, 3,4-dimethylstyrene, 3,5-dimethylstyrene, p-ethylstyrene, m-ethylstyrene and p-tert-butylstyrene; halogenated styrenes such as p-chlorostyrene, m-chlorostyrene, o-chlorostyrene, p-bromostyrene, m-bromostyrene, o-bromostyrene, p-fluorostyrene, m-fluorostyrene, o-fluorostyrene and o-methyl-p-fluorostyrene; alkoxystyrenes such as p-methoxystyrene, m-methoxystyrene, o-methoxystyrene, p-ethoxystyrene, m-ethoxystyrene and o-ethoxystyrene; carboxyester styrenes such as p-carboxymethylstyrene, m-carboxymethylstyrene and o-carboxymethylstyrene; and alkylether styrenes such as p-vinylbenzyl-propyl ether, or a mixture of two or more of the above.

In the present invention, such styrene-type monomers are initially brought into contact with alkylaluminoxane. The alkylaluminoxane to be used at that time is a reaction product of an alkylaluminum compound and water, and more specifically, it includes chain-like alkylaluminoxanes represented by the formula:

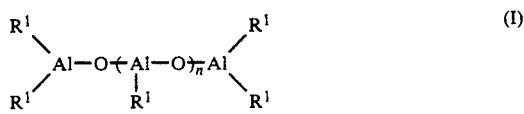

(I)

wherein n represents a degree of polymerization and is a number of 2 to 50, and $R^1$ represents and alkyl group having 1 to 8 carbon atoms, or cyclic alkylaluminoxanes having a recurring unit represented by the formula:

(II)

Of these alkylaluminoxanes, $R^1$ as a methyl group, i.e. methylaluminoxane is preferred.

The reaction product of the alkylaluminum compound such as trialkylaluminum and water is usually a mixture of the chain-like alkylaluminoxane or cyclic alkylaluminoxane and unreacted trialkylaluminum, or various condensed products, or further molecules in which the above compounds or products have a complex association, and it becomes various products depending on the conditions with contact of the alkylaluminum compound and water.

The reaction between alkylaluminum and water is not particularly limited and is carried out according to known methods. For example, these are methods such as (1) the method in which alkylaluminum is dissolved in an organic solvent and the resulting solution is contacted with water, (2) the method in which alkylaluminum is first added to the polymerization system, and then water is added thereto, and (3) the method in which water of crystallization contained in a metal salt or water adsorbed in an inorganic material or an organic material is reacted with alkylaluminum. In the above water, an amine such as ammonia and ethylamine, sulfur compound such as hydrogen sulfide and a phosphorus compound such as phosphite may be contained in an amount up to 20%.

The preferred alkylaluminoxane to be used in the present invention is prepared by the method in which, in which a hydrated compound such as a hydrated metal salt is used for water source, the resultant solid residue is filtered after the contact reaction of alkylaluminum with the hydrated compound and the filtrate is heated under atmospheric pressure or reduced pressure at a temperature of 30° to 200° C., preferably 40° to 150° C. for from 20 minutes to 8 hours, preferably from 30 minutes to 5 hours while removing the solvent. The temperature for the heat treatment, may be determined optimally depending on various conditions, but usually the above range can be used. If the temperature is less than 30° C., effects cannot be obtained, and if it exceeds 200° C. aluminoxane itself is pyrolyzed. Depending on the conditions of the heat treatment, the reaction product can be obtained as a colorless solid or solution. The product thus obtained can be used as a catalyst solution, if necessary, by dissolving or diluting with a hydrocarbon solvent.

Suitable examples of the alkylaluminoxane are methylaluminoxane in which the area of the high magnetic field component in the methyl proton signal region due to the aluminum-methyl group (Al—CH$_3$) bond as observed by the proton nuclear magnetic resonance method is not more than 50% of the total signal area.

In a proton nuclear magnetic resonance ($^1$H—NMR) spectral analysis of a solution of the alkylaluminoxane in toluene at room temperature, the methyl proton signal due to Al—CH$_3$ is observed in the region of 1.0 to −0.5 ppm (tetramethylsilane (TMS) standard). Since the proton signal of TMS (0 ppm) is in the 1.0 to −0.5 ppm region of the methyl proton signal due to Al—CH$_3$, the alkylaluminoxane is measured with toluene as the solvent as the standard. The methyl proton signal due to Al—CH$_3$ is divided into two components: the high magnetic field component in the −0.1 to −0.5 ppm region and the other magnetic field component in the 1.0 to −0.1 ppm region. In alkylaluminoxane preferably used in the present invention, the area of the high magnetic field component is not more than 50%, preferably 45 to 5% of the total signal area in the 1.0 to −0.5 ppm region.

In the process of the present invention, a styrene-type monomer is initially brought into contact with the alkylaluminoxane as mentioned above, and if necessary, the contact can be done in an aromatic hydrocarbon solvent such as benzene and toluene. A method in which a styrene-type monomer and alkylaluminoxane, which are the starting materials for polymerization, are directly put in contact with each other without using a solvent is suitable for bulk polymerization. In addition, to achieve contact, an organic aluminum compound is preferably added to the system because impurities can be removed and catalytic activity can be improved. Here, the organic aluminum compound includes a compound represented by the formula:

$$AlR^2_iR^3_jR^4_{3-(i+j)} \qquad (III)$$

wherein $R^2$, $R^3$ and $R^4$ each represent a hydrogen atom, an alkyl group or a alkoxy group having 1 to 8 carbon atoms, or a halogen atom; i and j each are integers of 0 to 3 and i+j is an integer of 0 to 3.

Specific examples of the organic aluminum compound include trimethylaluminum, triethylaluminum, tripropylaluminum, triisobutylaluminum, trioctylaluminum, chlorodimethylaluminum, chlorodiethylaluminum, hydrogenated diethylaluminum, hydrogenated diisobutylaluminum and diethylaluminum ethoxide. Of these compounds, an organic aluminum compound containing no halogen atoms, is preferred, and an organic aluminum compound having hydrogen, an ethyl group and/or isobutyl group such as triisobutylaluminum, hydrogenated diisobutylaluminum and hydrogenated diethylaluminum is more preferred.

Contact between the above styrene-type monomer and alkylaluminoxane (in other words, aging of alkylaluminoxane) is carried out at a temperature in the range of 0° to 100° C., preferably 20° to 80° C. for from 5 minutes to 2 hours, preferably from 10 minutes to one hour. If the aging temperature is less than 0° C., the said contact is almost ineffectual. If it is too high, an undesirable production of thermal polymer occurs.

The mechanism of aging (contact) is not sufficiently clear, but it can be considered that the associated state of high molecular structure aluminoxane is released and the color changes to a pale yellow.

In the process of the present invention, after carrying the contact, a transition metal compound further added. The transition metal compound includes a titanium compound, a zirconium compound and a vanadium compound. The titanium compound includes various ones and preferably at least one compound selected from a titanium compound and a titanium chelate compound represented by the formula:

$$TiR^5_aR^6_bR^7_cR^8_{4-(a+b+c)} \qquad (IV)$$

or

$$TiR^5_dR^6_eR^7_{3-(d+e)} \qquad (V)$$

wherein $R^5$, $R^6$, $R^7$ and $R^8$ each represent a hydrogen atom, an alkyl group having 1 to 20 carbon atoms, an alkoxy group having 1 to 20 carbon atoms, an aryl group having 6 to 20 carbon atoms, an alkylaryl group, an arylalkyl group, an acyloxy group having 1 to 20 carbon atoms, a cyclopentadienyl group, a substituted cyclopentadienyl group, an indenyl group or a halogen atom; a, b and c each are an integer of 0 to 4; and d and e each are an integer of 0 to 3.

$R^5$, $R^6$, $R^7$ and $R^8$ in the formulae (IV) and (V) each represent a hydrogen atom, an alkyl group having 1 to 20 carbon atoms (specifically, methyl group, ethyl group, propyl group, butyl group, amyl group, isoamyl group, isobutyl group, octyl group and 2-ethylhexyl group), an alkoxy group having 1 to 20 carbon atoms (specifically, methoxy group, ethoxy group, propoxy group, butoxy group, amyloxy group, hexyloxy group and 2-ethylhexyloxy group), an aryl group having 6 to 20 carbon atoms, an alkylaryl group and an arylalkyl group (specifically, phenyl group, tolyl group, xylyl group and benzyl group), an acyloxy group having 1 to 20 carbon atoms (specifically, heptadecylcarbonyloxy group), a cyclopentadienyl group and a substituted cyclopentadienyl group (specifically, methylcyclopentadienyl group, 1,2-dimethylcyclopentadienyl group and pentamethylcyclopentadienyl group), an indenyl group or a halogen atom (specifically, chlorine, bromine, iodine and fluorine). These $R^5$, $R^6$, $R^7$ and $R^8$ may be the same as or different from each other. Furthermore, a, b and c each are an integer of 0 to 4, and d and e each are an integer of 0 to 3.

More preferred titanium compounds include a titanium compound represented by the formula:

$$TiRXYZ \qquad (VI)$$

wherein R represents a cyclopentadienyl group, a substituted cyclopentadienyl group or an indenyl group; X, Y and Z are independently a hydrogen atom, an alkyl group having 1 to 12 carbon atoms, an alkoxy group having 1 to 12 carbon atoms, an aryl group having 6 to 20 carbon atoms, an aryloxy group having 6 to 20 carbon atoms, an arylaklyl group having 6 to 20 carbon atoms or a halogen atom.

The substituted cyclopentadienyl group represented by R in the above formula is, for example, a cyclopentadienyl group substituted by at least one of an alkyl group having 1 to 6 carbon atoms, more specifically, methylcyclopentadienyl group, 1,2-dimethylcyclopentadienyl group and pentamethylcyclopentadienyl group. In addition, X, Y and Z are each independently a hydrogen atom, an alkyl group having 1 to 12 carbon atoms (specifically, methyl group, ethyl group, propyl group, n-butyl group, isobutyl group, amyl group, isoamyl group, octyl group and 2-ethylhexyl group), an alkoxy group having 1 to 12 carbon atoms (specifically, methoxy group, ethoxy group, propoxy group, butoxy group, amyloxy group, hexyloxy group, octyloxy group and 2ethylhexyloxy group), an aryl group having 6 to 20 carbon atoms (specifically, phenyl group and naphthyl group), an aryloxy group having 6 to 20 carbon atoms (specifically, phenoxyl group), an arylalkyl group having 6 to 20 carbon atoms (specifically, benzyl group) or a halogen atom (specifically, chlorine, bromine, iodine and fluorine).

Specific examples of the titanium compound represented by the formula (VI) include
cyclopentadienyltrimethyltitanium,
cyclopentadienyltriethyltitanium,
cyclopentadienyltripropyltitanium,
cyclopentadienyltributyltitanium,
methylcyclopentadienyltrimethyltitanium,
1,2-dimethylcyclopentadienyltrimethyltitanium,
pentamethylcyclopentadienyltrimethyltitanium,
pentamethylcyclopentadienyltriethyltitanium,
pentamethylcyclopentadienyltripropyltitanium,
pentamethylcyclopentadienyltributyltitanium,
cyclopentadienylmethyltitanium dichloride,
cyclopentadienylethyltitanium dichloride,
pentamethylcyclopentadienylmethyltitanium dichloride,
pentamethylcyclopentadienylethyltitanium dichloride,
cyclopentadienyldimethyltitanium monochloride,
cyclopentadienyldiethyltitanium monochloride,
cyclopentadienyltitanium trimethoxide,
cyclopentadienyltitanium triethoxide,
cyclopentadienyltitanium tripropoxide,
cyclopentadienyltitanium triphenoxide,
pentamethylcyclopentadienyltitanium trimethoxide,
pentamethylcyclopentadienyltitanium triethoxide,
pentamethylcyclopentadienyltitanium tripropoxide,
pentamethylcyclopentadienyltitanium tributoxide,
pentamethylcyclopentadienyltitanium triphenoxide,
cyclopentadienyltitanium trichloride,
pentamethylcyclopentadienyltitanium trichloride,
cyclopentadienylmethoxytitanium dichloride,
cyclopentadienyldimethoxytitanium chloride,
pentamethylcyclopentadienylmethoxytitanium dichloride,
cyclopentadienyltribenzyltitanium,
pentamethylcyclopentadienylmethyldiethoxytitanium,
indenyltitanium trichloride, indenyltitanium trimethoxide,
indenyltitanium triethoxide, indenyltrimethyltitanium and
indenyltribenzyltitanium.

Of these titanium compounds, a compound containing no halogen atoms is preferred and a titanium compound having one π electron type ligand as mentioned above is particularly preferred.

Furthermore, a condensed titanium compound represented by the following formula (VII) can be used as the titanium compound.

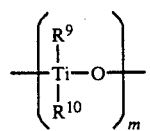

wherein $R^9$ and $R^{10}$ each represent a halogen atom, an alkoxy group having 1 to 20 carbon atoms or an acyloxy group; and m is an integer of 2 to 20.

Furthermore, the above titanium compounds can be used in the form of a complex formed with an ester or an ether.

The trivalent titanium compound represented by the formula (V) typically includes a trihalogenated titanium such as titanium trichloride; and a cyclopentadienyltitanium compound such a cyclopentadienyltitanium dichloride, and also those obtained by reducing a tetravalent titanium compound. These trivalent titanium compounds can be used in the form of a complex formed with an ester or an ether.

In addition, the zirconium compound used as the transition metal compound includes tetrabenzylzirconium, zirconium tetraethoxide, zirconium tetrabutoxide, bisindenylzirconium dichloride, trisiopropoxyzirconium chloride, zirconium benzyl dichloride and tributoxyzirconium chloride, and the vanadium compound includes bisacetylacetonatovanadium, triacetylacetonatovanadium, triethoxyvanadyl and tripropoxyvanadyl.

In the process of the present invention, if desired, in addition to the above transition metal compound, another catalytic components such as organic aluminum can be added.

The organic aluminum includes an organic aluminum compound represented by the formula:

wherein $R^{11}$ and $R^{12}$ each independently represent an alkyl group having 1 to 8 carbon atoms, preferably 1 to 4 carbon atoms; X represents a halogen; $0 \leq k \leq 3$, $0 \leq m \leq 3$, $0 \leq p < 3$, $0 \leq q < 3$, and $k+m+p+q=3$. The activity of the catalyst is further improved by adding the above compound.

The organic aluminum compound represented by the above formula (VIII) can be exemplified as shown below. Those corresponding to $p=q=0$ are represented by the formula: $R^{11}{}_k Al(OR^{12})_{3-k}$ (wherein $R^{11}$ and $R^{12}$ are the same as those mentioned above and k is preferably a number of $1.5 \leq k \leq 3$). Those corresponding to $m=p=0$ are represented by the formula: $R^{11}{}_k AlX_{3-k}$ (wherein $R^{11}$ and X are the same as those mentioned above and k is preferably a number of $0<k<3$). Those corresponding to $m=q=0$ are represented by the formula: $R^{11}{}_k AlH_{3-k}$ (wherein $R^{11}$ is the same as mentioned above and k is preferably a number of $2 \leq k < 3$). Those correspondint to $p=0$ are represented by the formula: $R^{11}{}_k Al(OR^{12})_m X_q$ (wherein $R^{11}$, $R^{12}$ and X are the same as those mentioned above, and $0<k\leq 3$, $0\leq m<3$, $0\leq q<3$ and $k+m+q=3$).

In the organic aluminum compound represented by the formula (VIII), the compound wherein $p=q=0$ and $k=3$ is selected from, for example, trialkylaluminum such as triethylaluminum and tributylaluminum, or combination thereof, and those preferred are triethylaluminum, tri-n-butylaluminum and triisobutylaluminum. In the case of p=q=0 and $1.5 \leq k < 3$, included are dialkylaluminum alkoxide such as diethylaluminum ethoxide and dibutylaluminum botoxide; alkylaluminumsesquialkoxide such as ethylaluminumsesquiethoxide and butylaluminumsesquibutoxide; as well as partially alkoxylated alkylaluminum having an average composition represented by $R^{11}{}_{2.5}Al(OR^{12})_{0.5}$. Examples of the compound corresponding to the case where m=p=0 include a partially halogenated alkylaluminum including dialkylaluminum halogenide (k=2) such as diethylaluminum chloride, dibutylaluminum chloride and diethylaluminum bromide; alkylaluminum sesquihalodenide (k=1.5) such as ethylaluminum sesquichloride, butylaluminum sesquichloride and ethylaluminum sesquibromide; and alkylaluminum dihalogenide (k=1) such as ethylaluminum dichloride, propylaluminum dichloride and butylaluminum dibromide. Examples of the compound corresponding to the case in which m=q=0 includes a partially hydrogenated alkylaluminum including dialkylaluminum hydride (k=2) such as diethylaluminum hydride and dibutylaluminum hydride; alkylaluminum dihydride (m=k) such as ethylaluminum dihydride and propylaluminum dihydride. Examples of the compound corresponding to the case in which p=0 include a partially alkoxylated or halogenated alkylaluminum such as ethylaluminumethoxy chloride, butylaluminumbutoxy dichloride and ethylaluminumethoxy bromide (k=m=q=1). Of these, triisobutylaluminum and triisobutylaluminum hydride are particularly suitable.

In the process for the present invention, the amount of the alkylaluminoxane to be blended with the styrene-type monomer is not particularly limited, but preferably 0.001 to 1 mole per one liter of the styrene-type monomer. A ratio of alkylaluminoxane (the organic aluminum compound may be included) and the transition metal compound, in terms of the ratio of aluminum and titanium, i.e. aluminum/titanium (molar ratio), is 1 to $10^6$, and preferably 10 to $10^4$.

Polymerization (or copolymerization) of the styrene-type monomer may be carried out in bulk polymerization and may be carried out in the presence of a solvent, e.g. an aliphatic hydrocarbon such as pentane, hexane and heptane; an alicyclic hydrocarbon such as cyclohexane; and an aromatic hydrocarbon such as benzene, toluene and xylene. Moreover, the polymerization temperature is not particularly limited, but is usually 0° to 100° C., preferably 40° to 80° C. Polymerization (or copolymerization) of the styrene-type monomer is carried out by using only the styrene-type monomers which are put in contact with alkylaluminoxane or by supplying other styrene-type monomers in the reaction system using the styrene-type monomers.

Further, in order to control the molecular weight of the resulting styrene-based polymer, it is effective to carry out the polymerization reaction in the presence of hydrogen.

The styrene-based polymer thus obtained has a high degree of syndiotactic configuration. Here, the styrene-based polymer which has a high degree of syndiotactic configuration means that its stereochemical structure is the syndiotactic configuration, i.e. the stereostructure in which phenyl groups or substituted phenyl groups as side chains are located alternately in opposite directions relative to the main chain consisting of carbon-carbon bonds. Tacticity is quantitatively determined by the nuclear magnetic resonance method ($^{13}C$—NMR method) using carbon isotope. The tacticity as determined by the $^{13}C$—NMR method can be indicated in terms of proportions of structural units continuously connected to each other, i.e. a diad in which two structural units are connected to each other, a triad in which three structural units are connected to each other and a pentad in which five structural units are connected to each other. The styrene-based polymers having such a high degree of syndiotactic configuration that the proportion of diad is at least 75% and preferably at least 85%, or the proportions of pentad (racemic pentad) is at least 30% and preferably at least 50%. The styrene-based polymers having a high degree of syndiotactic configuration of the present invention include polystyrene, poly(alkylstyrene), poly(halogenated styrene), poly(alkoxystyrene), poly(vinyl benzoate ester) and mixtures thereof, and copolymers containing them as main components. Here, the poly(alkylstyrene) includes poly(methylstyrene), poly(ethylstyrene), poly(isopropylstyrene) and poly(tertbutylstyrene), and the poly(halogenated styrene) includes poly(chlorostyrene), poly(bromostyrene) and poly(fluorostyrene). The poly(alkoxystyrene) includes poly(methoxystyrene) and poly(ethoxystyrene). Of these, a particularly preferred styrene-based polymer includes polystyrene, poly(p-methylstyrene), poly(m-methylstyrene), poly(p-tertbutylstyrene), poly(p-chlorostyrene), poly(m-chlorostyrene), poly(p-fluorostyrene), and further a copolymer of styrene and p-methylstyrene.

The styrene-based polymer produced by the process of the present invention usually has a number average molecular weight of 1,000 to 5,000,000, preferably 50,000 to 4,000,000 and a high syndiotacticity as mentioned above. Furthermore, if necessary, after polymerization, when the resulting polymer is subjected to decatalysing treatment with a washing solution containing hydrochloric acid, followed by washing and drying under reduced pressure, then washing with a solvent such as methyl ethyl ketone to remove soluble components and the resulting insolubles are treated with chloroform, a styrene-based polymer having a markedly large syndiotacticity and high purity can be obtained.

The present invention is described in greater detail with reference to the following examples.

EXAMPLE 1

(Preparation of alkylaluminoxane)

In a reactor made of a glass having an inner volume of 1000 ml and replaced with argon gas were charged 17.8 g (71 mmole) of copper sulfate pentahydrate ($CuSO_4 \cdot 5H_2O$), 200 ml of toluene and 24 ml (250 mmole) of trimethylaluminum and the mixture was reacted at 40° C. for 8 hours. After the reaction, solid materials were removed from the reaction mixture, and toluene was removed from the resulting solution at room temperature under a reduced pressure to obtain 6.7 g of a contact product (methylaluminoxane). A molecular weight of the product determined by the cryoscopic method was 610.

(2) Polymerization of styrene

In a 2 L (L=liter) autoclave made of stainless steel and filled with argon gas was charged 400 ml of styrene, and then 5 mmol of methylaluminoxane obtained by (1) above in terms of the Al atom, and the mixture was subjected to contact treatment at 70° C. for 30 minutes. After treatment, 0.025 millimole of pentamethylcyclopentadienyltitanium trimethoxide was supplied and the reaction was carried out at 70° C. for 2 hours. After the reaction, the reaction mixture was decatalysed with a mixed solution of hydrochloric acid and methanol, washed with methanol and dried to obtain 54.4 g of a polymer. Conversion was 15.0% by weight. It was also confirmed by the $^{13}$C—NMR that the polystyrene had a substantially 100% syndiotactic configuration in stereoregularity.

EXAMPLES 2 TO 5 AND COMPARATIVE EXAMPLES 1 TO 3

Styrene was polymerized in the same manner as in Example 1 except for using the component and conditions as shown in Table 1 below. Yield, conversion, etc. of the styrene polymers are shown in Table 1.

TABLE 1

| No. | Monomer Kinds | Monomer Amount (ml) | Methylaluminoxane (m. mol) | Organic aluminum Kinds | Organic aluminum Amount (m. mol) | Contact conditions Temperature (°C.) | Contact conditions Time (minutes) |
|---|---|---|---|---|---|---|---|
| Example 1 | Styrene | 400 | 5 | — | — | 70 | 30 |
| Comparative Example 1 | Styrene | 400 | 4 | — | — | — | — |
| Example 2 | Styrene | 400 | 4 | Al(i-Bu)$_3$ | 4 | 70 | 10 |
| Example 3 | Styrene | 400 | 4 | Al(i-Bu)$_3$ | 4 | 70 | 30 |
| Example 4 | Styrene | 400 | 4 | Al(i-Bu)$_3$ | 4 | 70 | 60 |
| Comparative Example 2 | Styrene | 400 | 4 | Al(i-Bu)$_3$ | 4 | — | — |
| Example 5 | Styrene | 400 | 4 | Al(i-Bu)$_2$H | 4 | 70 | 30 |
| Comparative Example 3 | Styrene | 400 | 4 | Al(i-Bu)$_2$H | 4 | — | — |

| No. | Transition metal compound Kinds | Transition metal compound Amount (m. mol) | Polymerization condition Temperature (°C.) | Polymerization condition Time (hour) | Polystyrene Yield (g) | Polystyrene Conversion (%) | Polystyrene Syndiotacticity[1] |
|---|---|---|---|---|---|---|---|
| Example 1 | Cp* Ti(OMe)$_3$ | 0.025 | 70 | 2 | 54.4 | 15.0 | 97 |
| Comparative Example 1 | Cp* Ti(OMe)$_3$ | 0.025 | 70 | 2 | 18.1 | 5.0 | 96 |
| Example 2 | Cp* Ti(OMe)$_3$ | 0.02 | 70 | 4 | 104.4 | 28.8 | 98 |
| Example 3 | Cp* Ti(OMe)$_3$ | 0.02 | 70 | 4 | 139.2 | 38.4 | 98 |
| Example 4 | Cp* Ti(OMe)$_3$ | 0.02 | 70 | 4 | 134.6 | 37.1 | 98 |
| Comparative Example 2 | Cp* Ti(OMe)$_3$ | 0.02 | 70 | 4 | 81.2 | 22.4 | 97 |
| Example 5 | Cp* Ti(OMe)$_3$ | 0.02 | 70 | 2 | 189.2 | 52.2 | 98 |
| Comparative Example 3 | Cp* Ti(OMe)$_3$ | 0.02 | 70 | 2 | 74.3 | 20.5 | 97 |

Note
Cp* = Pentamethylcyclopentadienyl group
[1]Indicate syndiotacticity (%) with racemic pentad.

As mentioned above, according to the process of the present invention, polymerization of a styrene-type monomer can be carried out with a high catalytic activity. Accordingly, when a styrene-type monomer is polymerized using the process of the present invention, a styrene-based polymer having a high syndiotacticity can be obtained with high efficiency.

The styrene-based polymer having a high degree of syndiotactic configuration thus obtained has various excellent physical properties such as heat resistance and chemical resistance, and can be effectively and widely utilized for various uses.

What is claimed is:

1. A process for producing a styrene polymer which comprises contacting a styrene monomer with alkylaluminoxane, adding a transition metal compound to the resulting mixture and then polymerizing the styrene monomer, wherein the styrene monomer is contacted with the alkylaluminoxane at 0° C. to 100° C. for from 5 minutes to 1 hour.

2. The process according to claim 1, wherein the styrene monomer is contacted with the alkylaluminoxane at 20° C. to 80° C. for from 10 minutes to one hour.

3. The process according to claim 1, wherein the alkylaluminoxane is a reaction product of an alkyl aluminum compound and water.

4. The process according to claim 1, wherein the said alkylaluminoxane is a chain-like alkylaluminoxane represented by the formula:

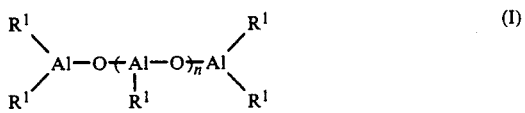

wherein n represents the degree of polymerization and a number of 2 to 50, and R$^1$ represents an alkyl group having 1 to 8 carbon atoms, or a cyclic alkylaluminoxane having a recurring unit represented by the formula:

wherein R$^1$ has the same meaning, as that defined above.

5. The process according to claim 1, wherein the alkylaluminoxane is subjected to heat treatment at 30° to 200° C. for from 20 minutes to 8 hours before the contacting with the styrene monomer.

6. The process according to claim 1, wherein the said alkylaluminoxane is subjected to heat treatment at 40° to 150° C. for from 30 minutes to 5 hours before the contacting with the styrene monomer.

7. The process according to claim 1, wherein the said alkylaluminoxane contains 50% or less of a high magnetic field component of methyl proton signal region based on aluminum-methyl group (Al—CH₃) bonding measured by the proton nuclear magnetic resonance method.

8. The process according to claim 3, wherein the alkyl aluminum compound is reacted with water in the presence of an aluminum compound.

9. The process according to claim 8, wherein the said aluminum compound is a compound represented by the formula:

$$AlR^2{}_iR^3{}_jR^4{}_{3-(i+j)} \quad (III)$$

wherein $R^2$, $R^3$ and $R^4$ each represent a hydrogen atom, an alkyl group or alkoxy group having 1 to 8 carbon atoms, or a halogen atom; i and j each are integers of 0 to 3 and i+j is an integer of 0 to 3.

10. The process according to claim 9, wherein the said aluminum compound is selected from the group consisting of trimethylaluminum, triethylaluminum, tripropylaluminum, triisobutylaluminum, trioctylaluminum, chlorodimethylaluminum, chlorodiethylaluminum, hydrogenated diethylaluminum, hydrogenated diisobutylaluminum and diethylaluminum ethoxide.

11. The process according to claim 1, wherein the said transition metal compound is selected from a titanium compound, a zirconium compound and a vanadium compound.

12. The process according to claim 11, wherein the said titanium compound is used and is at least one compound selected from the group consisting of a titanium compound and a titanium chelate compound represented by the formula:

$$TiR^5{}_aR^6{}_bR^7{}_cR^8{}_{4-(a+b+c)} \quad (IV)$$

and $$TiR^5{}_dR^6{}_eR^7{}_{3-(d+e)} \quad (V)$$

wherein $R^5$, $R^6$, $R^7$ and $R^8$ each represent a hydrogen atom, an alkyl group having 1 to 20 carbon atoms, an alkoxy group having 1 to 20 carbon atoms, an aryl group having 6 to 20 carbon atoms, an alkylaryl group, an arylalkyl group, an acyloxy group having 1 to 20 carbon atoms, a cyclopentadienyl group, a substituted cyclopentadienyl group, an indenyl group or a halogen atom; a, b and c each are an integer from 0 to 4; and d and e each are an integer from 0 to 3.

13. The process according to claim 11, wherein said titanium compound is used and is a compound represented by the formula:

$$TiRXYZ \quad (VI)$$

wherein R represents a cyclopentadienyl group, a substituted cyclopentadienyl group or an indenyl group; X, Y and Z are independently hydrogen atom, an alkyl group having 1 to 12 carbon atoms, an alkoxy group having 1 to 12 carbon atoms, an aryl group having 6 to 20 carbon atoms, an aryloxy group having 6 to 20 carbon atoms, an arylalkyl group having 6 to 20 carbon atoms or a halogen atom.

14. The process according to claim 11, wherein the said titanium compound is used and is a condensed titanium compound represented by the formula:

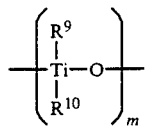

wherein $R^9$ and $R^{10}$ each represent a halogen atom, an alkoxy group having 1 to 20 carbon atoms or an acyloxy group; and m is an integer of 2 to 20.

15. The process according to claim 11, wherein the said zirconium compound is used and is selected from tetrabenzylzirconium, zirconium tetraethoxide, zirconium tetrabutoxide, bisindenylzirconium dichloride, trisiopropoxyzirconium chloride, zirconium benzyl dichloride and tributoxyzirconium chloride.

16. The process according to claim 11, wherein the said vanadium compound is used and is selected from bisacetylacetonatovanadium, triacetylacetonatovanadium, triethoxyvanadyl and tripropoxyvanadyl.

17. The process according to claim 10, wherein said styrene monomer is styrene, p-methylstyrene, m-methylstryrene, o-methyl-styrene, 2,4-dimethylstyrene, 2,5-dimethylstyrene, 3,4-dimethylstyrene, 3,5-dimethylstyrene, p-ethylstyrene, m-ethylstryrene, p-tert-butylstyrene; p-chlorostyrene, m-chlorostyrene, o-chlorostyrene, p-bromostryrene, m-bromostyrene, o-methylbromostyrene, p-fluorostyrene, m-fluorostyrene, o-fluorostyrene, o-methyl-p-fluorostyrene; p-methoxystyrene, m-methoxystyrene, o-methoxystyrene, p-ethoxystyrene, m-ethoxystyrene; o-ethoxystyrene; p-carboxymethylstyrene, m-carboxymethylstyrene, o-carboxymethylstyrene; p-vinylbenzyl-propyl ether; or a mixture of two or more of the above.

18. The process according to claim 11, wherein said styrene monomer is styrene, p-methylstyrene, m-methylstyrene, o-methyl-styrene, 2,4-dimethylstyrene, 2,5-dimethylstyrene, 3,4-dimethylstyrene, 3,5-dimethylstyrene, p-ethylstyrene, m-ethylstyrene, p-tert-butylstyrene; p-chlorostyrene, m-chlorostyrene, o-chlorostyrene, p-bromostryrene, m-bromostyrene, o-methylbromostyrene, p-fluorostyrene, m-fluorostyrene, o-fluorostyrene, o-methyl-p-fluorostyrene; p-methoxystyrene, m-methoxystyrene, o-methoxystyrene, p-ethoxystyrene, m-ethoxystyrene; o-ethoxystyrene; p-carboxymethylstyrene, m-carboxymethylstyrene, o-carboxymethylstyrene; p-vinylbenzyl-propyl ether; or a mixture of two or more of the above.

19. The process according to claim 12, wherein the titanium compound is cyclopentadienyltrimethyltitanium, cyclopentadienyltriethyltitanium, cyclopentadienyltripropyltitanium, cyclopentadienyltributyltitanium, methylcyclopentadienyltrimethyltitanium, 1,2-dimethylcyclopentadienyltrimethyltitanium, pentamethylcyclopentadienyltrimethyltitanium, pentamethylcyclopentadienyltriethyltitanium, pentamethylcyclopentadienyltripropyltitanium, pentamethylcyclopentadienyltributyltitanium, cyclopentadienylmethyltitanium dichloride, cyclopentadienylethyltitanium dichloride, pentamethylcyclopentadienylmethyltitanium dichloride, pentamethylcyclopentadienylethyltitanium dichloride, cyclopentadienyldimethyltitanium monochloride, cyclopentadienyldiethyltitanium monochloride, cyclopentadienyltitanium trimethoxide, cyclopentadienyltitanium triethoxide, cyclopentadienyltitanium tripropoxide, cyclopentadienyltitanium triphenoxide, pentamethylcyclopentadienyltitanium trimethoxide, pentamethylcyclopentadienyltitanium triethoxide, pentamethylcyclopentadienyltitanium tripropoxide, pentamethylcylopentadienyltitanium tributoxide, pentamethylcyclopentadienyltitanium triphenoxide, cyclopentadienyltitanium trichloride, pentamethylcyclopentadienyltitanium trichloride, cyclopentadienylmethoxytitanium dichloride, cyclopentadienyldimethoxytitanium chloride, pentamethylcyclopentadienylmethoxytitanium dichloride, cyclopentadienyltribenzyltitanium, pentamethylcyclopentadienylmethyldiethoxytitanium, indenyltitanium trichloride, indenyltitanium trimethoxide, indenyltitanium triethoxide, indenyltrimethyltitanium and indenyltribenzyltitanium.

* * * * *